(12) United States Patent
Radu et al.

(10) Patent No.: US 7,237,933 B2
(45) Date of Patent: *Jul. 3, 2007

(54) DOOR TRIM BOLSTER WITH ELECTROLUMINESCENT LAMP AND INJECTION MOLDING METHOD OF MAKING SAME

(75) Inventors: Bogdan Radu, Dearborn, MI (US); David Dooley, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/711,462

(22) Filed: Sep. 20, 2004
(Under 37 CFR 1.47)

(65) Prior Publication Data
US 2006/0061138 A1 Mar. 23, 2006

(51) Int. Cl.
*B60Q 1/00* (2006.01)
*B60Q 1/26* (2006.01)
*B60R 7/04* (2006.01)
*B60J 5/00* (2006.01)

(52) U.S. Cl. ............... 362/488; 362/84; 362/501; 296/146.7; 296/37.13

(58) Field of Classification Search ............ 362/488, 362/496, 501, 84; 296/146.7, 37.13
See application file for complete search history.

(56) References Cited

U.S. PATENT DOCUMENTS

| 2,083,753 | A | | 6/1937 | Turner |
| 2,851,585 | A | | 9/1958 | Glowzinski ............... 240/2 |
| 4,104,555 | A | * | 8/1978 | Fleming ............... 313/512 |
| 4,602,358 | A | | 7/1986 | Sato ............... 369/12 |
| 4,619,624 | A | | 10/1986 | Kerr, III et al. ............ 445/22 |
| 4,670,819 | A | * | 6/1987 | Boerema et al. ........ 362/501 |
| 4,875,143 | A | | 10/1989 | Fernandez |
| 5,013,967 | A | * | 5/1991 | Hirotaka et al. ........ 313/512 |
| 5,064,974 | A | | 11/1991 | Vigneau et al. ......... 200/61.62 |
| 5,158,353 | A | | 10/1992 | Kimisawa |

(Continued)

FOREIGN PATENT DOCUMENTS

DE 4141297 6/1993

(Continued)

OTHER PUBLICATIONS

US Patent and Trademark Office, Office Action issued in related U.S. Appl. No. 10/711,480 dated Nov. 8, 2006.

(Continued)

*Primary Examiner*—Jong-Suk (James) Lee
*Assistant Examiner*—David Makiya
(74) *Attorney, Agent, or Firm*—Wood, Herron & Evans, LLP

(57) ABSTRACT

An automotive interior component including an electroluminescent lamp capable of emitting visible light. The electroluminescent lamp of the component may integrally molded with a polymer body to define a unitary assembly. The interior component may be, for example, a bolster mounted to a door trim panel for concealing an opening in the door panel. The electroluminescent lamp is mounted to the door bolster and emits that visible light, when powered, for illuminating a portion of the door trim panel. A covering may be provided over the electroluminescent lamp through which the visible light is transmitted. The assembly of the interior component and the electroluminescent lamp may be formed by an injection molding process.

9 Claims, 3 Drawing Sheets

U.S. PATENT DOCUMENTS

| | | | |
|---|---|---|---|
| 5,193,895 A | 3/1993 | Naruke et al. | |
| 5,434,013 A * | 7/1995 | Fernandez | 428/690 |
| 5,434,757 A | 7/1995 | Kashiwagi | 362/80 |
| 5,452,190 A | 9/1995 | Priesemuth | 362/255 |
| 5,780,965 A | 7/1998 | Cass et al. | 313/506 |
| 5,811,930 A | 9/1998 | Krafcik et al. | 313/510 |
| 6,000,493 A | 12/1999 | Chen | |
| 6,000,822 A | 12/1999 | Polizzi et al. | 362/488 |
| 6,013,956 A | 1/2000 | Anderson, Jr. | 307/10.1 |
| 6,116,672 A | 9/2000 | Cannon et al. | 298/37.13 |
| 6,139,304 A | 10/2000 | Centofante | 425/121 |
| 6,158,869 A | 12/2000 | Barnes, Jr. | |
| 6,160,475 A * | 12/2000 | Hornung et al. | 340/461 |
| 6,193,399 B1 | 2/2001 | Hulse | 362/511 |
| 6,196,606 B1 | 3/2001 | McGoldrick | 296/37.13 |
| 6,217,201 B1 | 4/2001 | Hulse | 362/511 |
| 6,270,229 B1 | 8/2001 | Chien | |
| 6,286,983 B1 | 9/2001 | Macher et al. | 362/487 |
| 6,315,436 B1 | 11/2001 | Schenk et al. | 362/488 |
| 6,419,379 B1 | 7/2002 | Hulse | 362/488 |
| 6,464,381 B2 * | 10/2002 | Anderson et al. | 362/488 |
| 6,536,825 B2 | 3/2003 | McAndrew et al. | 296/37.13 |
| 6,536,928 B1 * | 3/2003 | Hein et al. | 362/464 |
| 6,545,418 B1 | 4/2003 | Kolpasky et al. | |
| 6,594,417 B1 | 7/2003 | Hulse | 385/31 |
| 6,641,276 B1 | 11/2003 | Macher et al. | |
| 6,652,128 B2 | 11/2003 | Misaras | 362/488 |
| 6,656,397 B1 | 12/2003 | Hansen et al. | 264/45.4 |
| 6,746,067 B2 | 6/2004 | Schmidt et al. | 296/37.13 |
| 6,786,614 B2 | 9/2004 | Ciarrocchi, Jr. | |
| 6,945,581 B2 | 9/2005 | Taylor | 296/37.8 |
| 7,156,437 B2 * | 1/2007 | Cowelchuk et al. | 296/1.08 |
| 2001/0030871 A1 | 10/2001 | Anderson, Jr. et al. | 362/488 |
| 2001/0053082 A1 | 12/2001 | Chipalkatti et al. | 362/496 |
| 2003/0002273 A1 | 1/2003 | Anderson, Jr. et al. | 362/84 |
| 2003/0031330 A1 | 2/2003 | Kim | |
| 2003/0048912 A1 | 3/2003 | Reich | |
| 2004/0017687 A1 | 1/2004 | Misaras | 362/489 |
| 2004/0108606 A1 | 6/2004 | Goggins | |
| 2004/0175014 A1 | 9/2004 | Liu | |
| 2005/0002199 A1 | 1/2005 | Stuffle et al. | |
| 2005/0140167 A1* | 6/2005 | Jaggi | 296/146.7 |
| 2006/0271261 A1* | 11/2006 | Flores et al. | 701/49 |

FOREIGN PATENT DOCUMENTS

| | | |
|---|---|---|
| DE | 19518169 | 11/1996 |
| DE | 29719025 | 12/1997 |
| DE | 298 08 949 U1 | 7/1998 |
| DE | 199 10 973 | 10/2000 |
| DE | 10010088 | 6/2001 |
| DE | 10129021 | 9/2002 |
| DE | 101 51 704 | 10/2003 |
| DE | 10240270 | 3/2004 |
| DE | 20 2004 002 786 U1 | 6/2004 |
| DE | 103 16 678 B3 | 8/2004 |
| DE | 10314352 A1 | 10/2004 |
| DE | 10335868 | 3/2005 |
| DE | 10338898 | 3/2005 |
| DE | 10341253 A1 | 4/2005 |
| DE | 60012295 T2 | 8/2005 |
| DE | 202005009668 | 10/2005 |
| EP | 1298007 | 4/2003 |
| EP | 1 188 615 A3 | 6/2004 |
| EP | 1110822 B1 | 7/2004 |
| EP | 1448027 A1 | 8/2004 |
| FR | 2838669 | 10/2003 |
| JP | 57194126 | 11/1982 |
| JP | 9086273 | 3/1997 |
| JP | 9097026 | 4/1997 |
| JP | 11162633 | 6/1999 |
| JP | 2000344011 | 12/2000 |
| JP | 2002046529 | 2/2002 |
| JP | 2002096691 A | 4/2002 |
| JP | 2003086354 | 3/2003 |
| WO | WO 98/57097 | 12/1998 |
| WO | WO 01/63172 | 8/2001 |
| WO | 03101779 A2 | 12/2003 |

OTHER PUBLICATIONS

United States Patent and Trademark Office, Notice of Allowance and Fee(s) Due mailed May 25, 2006 in related U.S. Appl. No. 10/711,636.

Dipl.-ing. Ropling; German Patent and Trademark Office, Office Action dated May 18, 2006 (4 pages).

German Patent Office, Office Action mailed May 5, 2006 in corresponding German Application No. 10 2005 043 901.2-42 to related U.S. Appl. No. 10/711,385.

U.S. Patent and Trademark Office, Office Action dated Sep. 27, 2006 in related U.S. Appl. No. 10/711,463.

Dipl.-ing. Gottstein, German Patent and Trademark Office, Office Action Dated Aug. 2, 2006 in related German Application No. 10 2005 052 533.4 (4 pages).

Dipl.-ing. Gottstein, German Patent and Trademark Office, Office Action Dated Aug. 2, 2006 in related German Application No. 10 2005 052 534.2-42 (3 pages).

Dipl.-Ing. Univ. Stefan Geisenberger, German Patent and Trademark Office, Office Action Dated Jun. 7, 2006 (3 pages).

Friedhofer, Michael A., United States Patent and Trademark Office, Office Action Mailed Jun. 27, 2006 in related U.S. Appl. No. 10/711,385.

Truong, Bao Q., United States Patent and Trademark Office, Office Action Mailed Jun. 23, 2006 in related U.S. Appl. No. 10/711,480.

UK Patent Office, Examination Report Issued in Corresponding UK Application No. GB0518379.3 dated Sep. 22, 2006 (1 page).

German Patent Office, Office Action Dated Sep. 21, 2005, Untranslated (4 pages).

The UK Patent Office, Search Report Issued in GB0518067.4, Date of Search: Nov. 29, 2005.

The UK Patent Office, Search Report from GB0518379.3, Date of Search: Nov. 24, 2005.

The UK Patent Office, Search Report from GB0521213.9, Date of Search: Jan. 18, 2006.

The UK Patent Office, Search Report issued in GB0521210.5, Date of Search: Jan. 20, 2006.

The UK Patent Office, Search Report Issued in GB0518374.4, Date of Search: Dec. 1, 2005.

United States Patent and Trademark Office, Office Action mailed Dec. 23, 2005 in related U.S. Appl. No. 10/711,385.

European Patent Office, Search Report issued in Corresponding Application No. GB0521216.2, Date of Search: Mar. 27, 2006.

Bogdan Radu et al., U.S. Appl. No. 10/711,636, filed Sep. 29, 2004.

Bogdan Radu et al., U.S. Appl. No. 10/711,652, filed Sep. 29, 2004.

Bogdan Radu et al., U.S. Appl. No. 10/711,480, filed Sep. 21, 2004.

Bogdan Radu, U.S. Appl. No. 10/711,385, filed Sep. 15, 2004.

Bogdan Radu et al., U.S. Appl. No. 10/711,463, filed Sep. 20, 2004.

Luks, Jeremy Austin (Examiner), US Patent and Trademark Office, Office Action issued in related U.S. Appl. No. 10/711,463, dated Mar. 21, 2007.

* cited by examiner

DOOR TRIM BOLSTER WITH ELECTROLUMINESCENT LAMP AND INJECTION MOLDING METHOD OF MAKING SAME

CROSS-REFERENCE TO RELATED APPLICATIONS

This application is related to U.S. patent application Ser. No. 10/711,385 filed Sep. 15, 2004, now pending, U.S. patent application Ser. No. 10/711,463 filed Sep. 20, 2004, now pending, U.S. patent application Ser. No. 10/711,480 filed Sep. 21, 2004, now pending, U.S. patent application Ser. No. 10/711,636, filed Sep. 29, 2004, now U.S. Pat. No. 7,150,550, and U.S. patent application Ser. No. 10/711,652 filed Sep. 29, 2004, now U.S. Pat. No. 7,017,968.

DESCRIPTION

1. Field of the Invention

The present invention pertains generally to automotive interiors and more particularly to door bolsters for automotive interiors.

2. Background of the Invention

Vehicle door constructions typically feature a metal door frame with a sheet metal outer panel or skin that defines the door's exterior and an inner sheet metal panel secured to the door frame. Various door components, including window regulator rails, audio speakers, latches, and the like, are fastened in openings defined in the inner sheet metal panel. Covering the inner door panel is a removable trim panel that provides an aesthetically pleasing facade viewed by occupants seated in the passenger cabin of the motor vehicle. Controls are provided on the trim panel for devices such as seats, door locks, mirror and windows. The door latch is connected by a cable to an inner release handle on the trim panel accessible to the vehicle occupant.

A bolster covers an access opening defined in the trim panel. When the bolster is removed, a technician or assembly line worker can access the space between the trim panel and the inner door panel to install or service the door components and their drive mechanisms. Conventional bolsters do not include light sources and, therefore, are not visible to an occupant of the passenger cabin under low-lighting conditions, such as early evening or dusk, and darkness caused by storms during the daytime and the like.

What is needed therefore is a lighting construction for a door bolster that improves on conventional door bolsters.

SUMMARY OF THE INVENTION

In an embodiment of the invention, an automotive interior component includes an electroluminescent lamp integrally molded with a polymer body to define a unitary assembly.

In another embodiment of the invention, an automotive interior component includes a door trim panel capable of being mounted to a vehicle door and a bolster engaged with the door panel to conceal the opening. An electroluminescent lamp mounted to the door bolster emits that visible light, when powered, for illuminating the door trim panel.

In another embodiment of the invention, a method is provided for making an automotive interior component in a mold with a pair of half sections that form a mold cavity with a geometrical shape resembling a bolster for a door trim panel and a gate for filling the mold cavity. The method includes placing an electroluminescent lamp between the half sections of the mold, closing the mold half sections, and injecting a molten polymer resin through the to fill a portion of the mold cavity unfilled by the electroluminescent lamp. The method further includes opening the mold half sections after the molten polymer resin solidifies and ejecting the automotive interior component having the geometrical shape of the bolster from the mold.

These and other objects and advantages of the invention shall become more apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
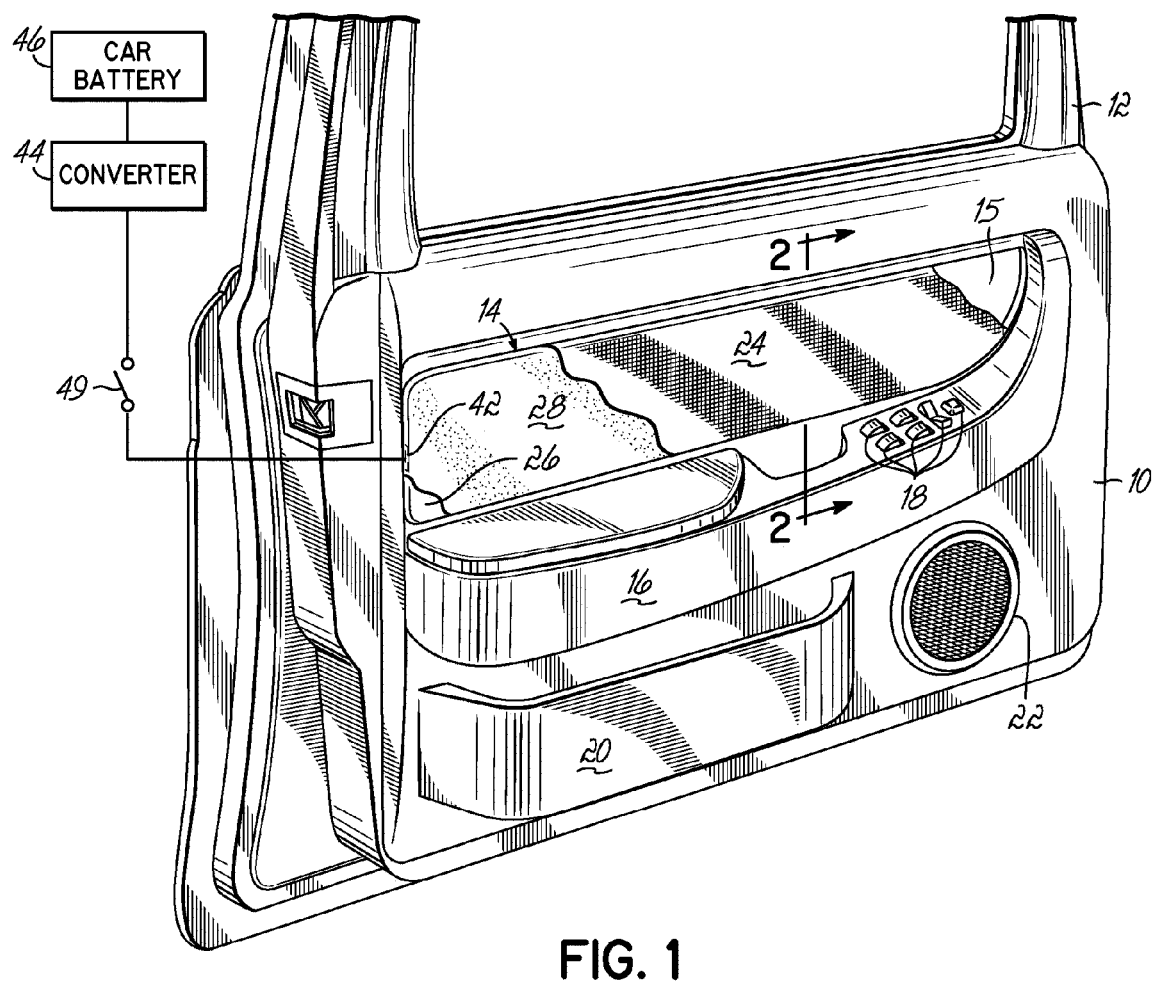
FIG. 1 is a perspective view of a door trim panel fastened to a vehicle door frame and including a bolster of the present invention.

With reference to FIG. 1, a door trim panel 10 constructed in accordance with an embodiment of the invention is shown fastened to a door of a vehicle such as, for example, an automobile, a truck, or an aircraft. More specifically, door trim panel 10 is coupled as an assembly with the inner sheet metal of a door frame 12, which has a hinged attachment with a body of an automobile. The trim panel 10 may be attached to the door frame 12 by suitable fasteners (not shown) as is well known in the art. Persons of ordinary skill in the art will appreciate that door trim panel 10 may be used on other door assemblies including but not limited to sliding doors, hatches, etc. Further, persons of ordinary skill in the art will also appreciate that door frame 12 may be constructed of other materials such as composites like fiberglass and carbon fibers. A passenger occupying the passenger cabin of the automobile can manually move the assembled door relative to the body for passenger ingress and egress of the passenger cabin.

The door trim panel 10 includes a bolster 14 covering an access opening 15 to the open space between the trim panel 10 and the door frame 12, an armrest 16, a plurality of electrical switches 18 on the arm rest 16, a map pocket closeout 20, and a speaker grille 22 that covers an audio speaker (not shown). The bolster 14 may be removably mounted to the trim panel 10. Alternatively, the bolster 14 may be permanently mounted by heat staking, gluing, ultrasonic welding, or the like to the trim panel 10 so that the access opening 15 cannot be exposed by removing the bolster 14.

The bolster 14 further includes an electroluminescent (EL) lamp 28 oriented for emitting a diffuse light to illuminate nearby objects inside the passenger cabin and to illuminate components on the door trim panel 10, such as the electrical switches 18. Different lighting effects can be achieved by varying the position of the EL lamp 28 within the bolster 14.

All or a portion of the bolster 14 may be covered with an optional covering 24. Covering 24 may be a flexible decorative trim material, such as a textile or fabric like woven cloth, vinyl, and/or leather, that is adhesively bonded to the EL lamp 28 and/or a polymer body 26 of the bolster 14. Coverings 24 formed from trim materials like vinyl and leather will require perforations adequate to transmit visible light from the EL lamp 28; whereas, woven fabric will intrinsically include an open weave having a pattern of openings transmitting the visible light emitted by EL lamp 28. The openings in materials like vinyl and leather preferably should be large enough to allow for significant light emission without reducing the structural integrity of covering 24. The openness of the weave of a fabric will determine the level of light transmission.

Alternatively, covering 24 may be a light-transmissive translucent non-porous, solid material that may be colored differently than the visible light emitted from EL lamp 28 so that the color of the transmitted light observed inside the passenger cabin differs from the color of the light emitted by EL lamp 28. For example, the covering 24 may constitute a continuous film that operates as a color filter that transmits visible light in a band of wavelengths and absorbs visible light outside of this band. The amount by which covering 24 reduces the emitted light intensity from EL lamp 28 during transmission is a matter of design choice for the particular application and may be adjusted to match the particular application.

Figure 2:
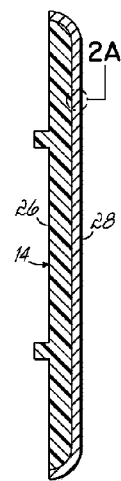
FIG. 2 is a cross-sectional view taken generally along line 2-2 of FIG. 1.
Figure 2A:
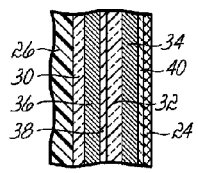
FIG. 2A is a detailed view of a portion of FIG. 2.

With reference to FIGS. 2 and 2A, the EL lamp 28 consists of a stacked structure of multiple layers carried on a suitable flexible structural substrate 30. The layered structure includes a layer of an EL phosphor 32 disposed between substantially parallel front and rear electrodes 34 and 36, respectively. The phosphor layer 32 is contiguous with the front electrode 34 but spaced from, and electrically isolated from, the rear electrode 36 by a dielectric layer 38. The front electrode 34, which faces into the interior of the passenger compartment, is light transmissive (i.e., transparent or translucent) for transmitting light emitted from the phosphor layer 32 when an electric field is applied between the front and rear electrodes 34, 36. The dielectric layer 38 may be pigmented to supply a dark or colored background for the emitted light.

A protective encapsulation layer 40 of a light-transmissive substance, such as polycarbonate or another polymer suitable for this application, optionally covers the front electrode 34 of the EL lamp 28. The encapsulation layer 40 may be applied to the stacked structure as a printed ink layer. An electrical connector 42, such as an edge electrical connector, includes power contacts that are coupled with the front and rear electrodes 34, 36. The power contacts of the electrical connector 42 are exposed through the encapsulation layer 40 for establishing electrical contacts.

The layers of the EL lamp 28 may be printed onto the substrate by rotary screen printing, flexographic printing, or other printing methods using conducting, insulating and electroluminescent ink compositions. The ink compositions are printed across a desired print area on the substrate 30, or alternatively on the encapsulation layer 40, and then dried to remove volatile solvents for forming stable layers. Some of the layers in the stacked structure may be printed more than once in order to assure proper thickness.

Phosphor ink compositions are available to emit light in many colors, such as green, blue, and yellow, and may also be blended to produce white or colored light emission. Typical EL phosphors for EL lamp 28 are comprised of inorganic zinc sulfide-based materials doped to create the desired color emission. Suitable EL phosphor ink compositions include white, blue-green and yellow-green LUX-PRINT® electroluminescent inks commercially available from DuPont Microcircuit Materials (Research Triangle Park, N.C.).

In one embodiment of the invention, a flexible metallized film may effectively function as the substrate 30, the rear electrode 36 and the dielectric layer 38 of the EL lamp 28. Such metallized films include a thin layer of a metallic conductive material, like aluminum, deposited on one side of a film material, like polyester. The deposited metallic layer operates as the rear electrode 36 and the film material acts as the dielectric layer 38. The metallized film also serves as a substrate 30 for application of the remaining printed component layers (e.g., phosphor layer 32 and front electrode 34) of the stacked structure.

An inverter or converter 44 electrically couples a direct current (DC) electrical system of the vehicle, which includes the car battery 46, with the electrical connector 42. The converter 44 converts the DC voltage from the electrical system to generate an alternating current (AC) driving voltage in the range of 80 to 200 VAC, preferably about 110 VAC, at a frequency in the region of 300 to 500 Hz, preferably about 400 Hz. Additional circuitry, as recognized by persons of ordinary skill in the art, may be provided as required to ensure proper operation of the EL lamp 28. Application of the AC driving voltage across the front and rear electrodes 34, 36 of the EL lamp 28 generates a varying electric field within the phosphor layer 32 causing the constituent phosphor particles to emit visible light. In general, the brightness of the EL lamp 28 increases with increased voltage and frequency. Power to the EL lamp 28 may be switched, for example, in coordination with operation of a light switch 49 controlling exterior vehicle lighting so that the EL lamp 28 is powered when the exterior lights are powered or, alternatively, in conjunction with the operation of the interior lighting.

The EL lamp 28 has a low power consumption and very low heat generation as compared with conventional lamps used in such automotive applications. Furthermore, the EL lamp 28 is sturdy and exhibits excellent vibration and impact resistance. The EL lamp 28 will have a lengthy life and will not normally need replacement over the life of the automobile, in contrast to the need to periodically replace burnt-out conventional incandescent bulbs. The resin material forming the bolster 14 need not be heat resistant as the EL lamp 28 has a cooler operating temperature than conventional incandescent bulbs.

Figure 3:
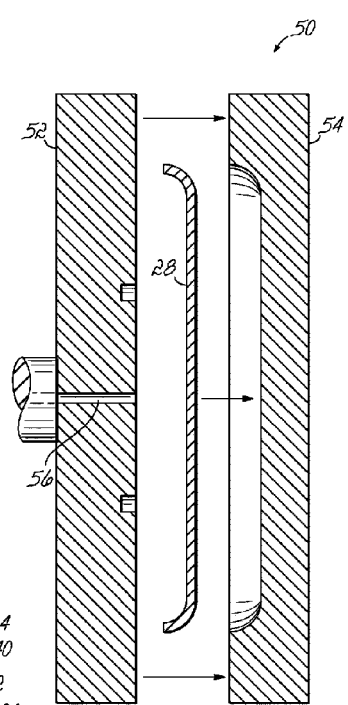
FIGS. 3-5 are diagrammatic cross-sectional views illustrating a molding process for forming the bolster of the present invention.
Figure 4:
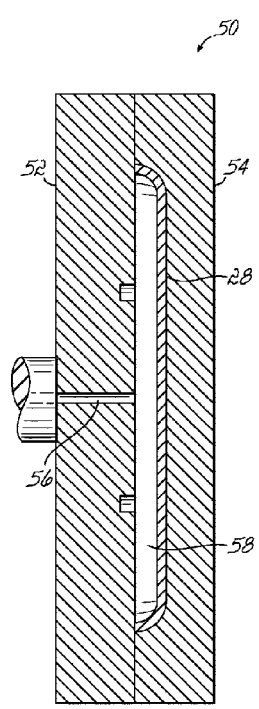
Figure 5:
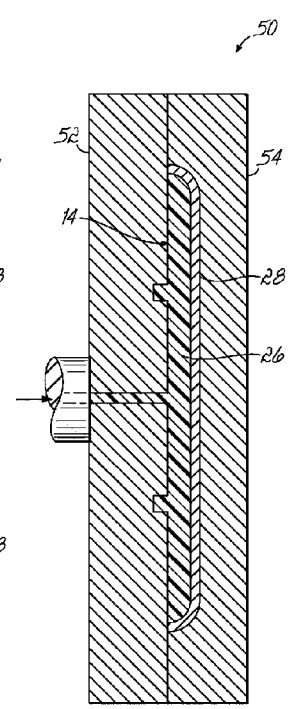

With reference to FIGS. 3-5, a method of making the bolster 14 will be described that illustrates a processing sequence in which the EL lamp 28 is integrally injection molded with the polymer portion of the bolster 14. In FIG. 3, an injection die or mold 50 having first and second mold sections 52, 54 is provided. The EL lamp 28 is placed at a specified location between the first and second mold sections 52, 54 so that the power contacts of the electrical connector 42 (FIG. 2) are exposed after molding for establishing electrical contacts. As shown in FIG. 4, the mold 50 is closed so that the first and second mold sections 52, 54 define a mold cavity 58 having the general three-dimensional geometrical shape of the bolster 14.

As shown in FIG. 5, molten resin material is injected by an extruder through one or more gates 56 into the mold cavity 58 and fills the space inside the cavity 58 not occupied by the EL panel 28. The synthetic resin material is selected according to the characteristics required for the bolster 14 and may be any engineering polymer material suitable for an injection molding process, such as polypropylene. The injection molding process creates sufficient pressure and heat to bond the EL lamp 28 and the polymer body 26 defined by the solidified resin material to form the bolster 14 as an integral structure. The mold 50 is opened by separating the mold sections 52, 54 and the bolster 14 is ejected from the mold 50 in a condition ready for delivery as a unitary component for assembly on an automotive production line.

If necessary, the bolster 14 may then either be partially or completely vacuum- or thermo-formed to achieve a final desired shape. In this regard, the shape of the mold cavity 58 may not reflect the three-dimensional geometrical shape of the bolster 14 as such post injection molding processes may be used to form the final shape.

The invention also contemplates that the article formed by the injection molding process may be the entire trim panel 10 with an integral bolster 14 that includes the EL lamp 28. In this embodiment, the three-dimensional geometrical shape of the mold cavity 58 will reflect that of the trim panel 10 or a post injection molding process is used to shape the molded article to form the final shape of trim panel 10.

Figure 6:
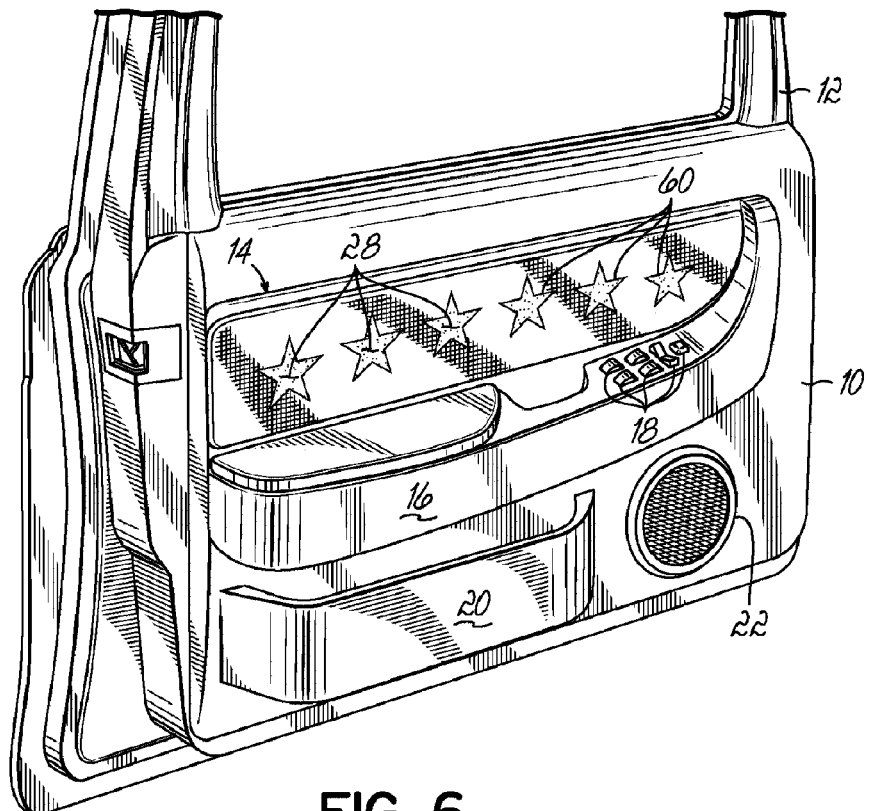
FIG. 6 is a view of a bolster in accordance with an alternative embodiment of the invention.

With reference to FIG. 6 in which like reference numerals refer to like features in FIGS. 1-5 and in an alternative embodiment of the invention, the covering 24 over EL lamp 28 may include openings 60 that are shaped and dimensioned to define decorative symbols like stars or animal shapes, curved symbols like circles and ovals, or polygonal symbols like squares, triangles, and rectangles, that would be recognized as a symbol by an occupant of the passenger cabin of the vehicle. The openings 60 can be arranged in aligned or staggered rows or may be a combination of different sizes and geometric shapes. The size, spacing, rotation/orientation, arrangement, and combination of openings are selectable based on a desired result for an illumination pattern.

Figure 7:
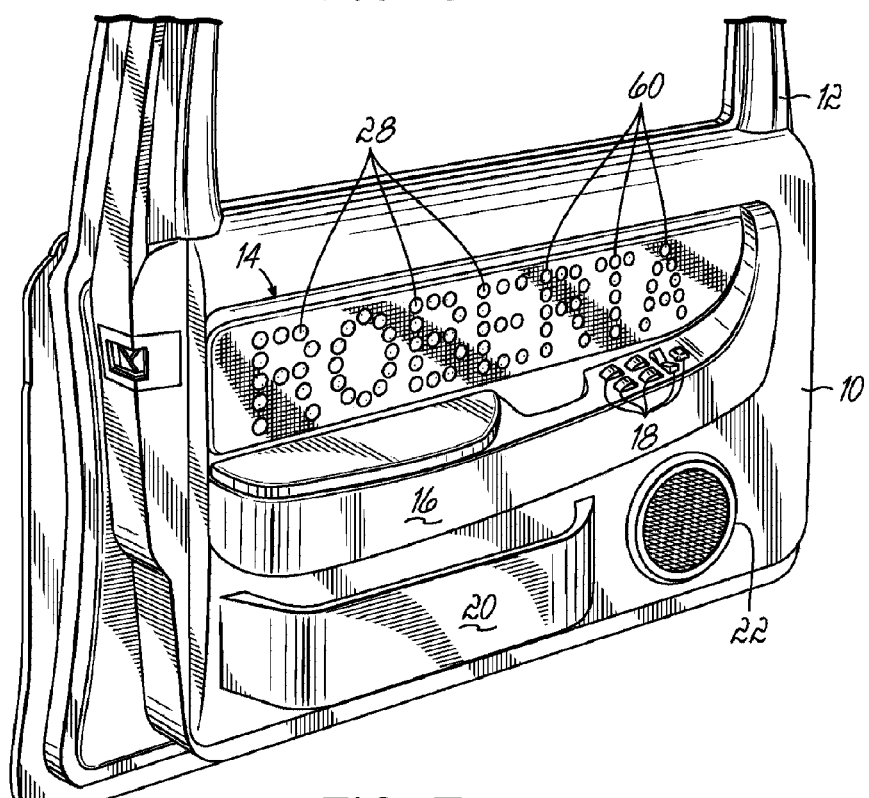
FIG. 7 is a view of a bolster in accordance with another alternative embodiment of the invention.

With reference to FIG. 7 in which like reference numerals refer to like features in FIG. 6 and in an alternative embodiment of the invention, the openings 60 in covering 24 may be dimensioned and arranged to define alphanumeric characters spaced across the bolster 14 to spell text, such as a vehicle logo or a person's name, perceivable by an occupant of the passenger cabin. This embodiment of the invention could be used, for example, to personalize the automobile interior.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. An automotive interior component for a vehicle door, comprising:
    a door trim panel capable of being mounted to the vehicle door, said door trim panel including an opening;
    a bolster engaged with said door panel to conceal said opening; and
    an electroluminescent lamp mounted to said bolster, said electroluminescent lamp emitting visible light, when powered, that illuminates at least a portion of said door trim panel, wherein said bolster and said electroluminescent lamp are integrally molded to define a unitary construction.

2. The automotive interior component of claim 1 wherein said bolster is removable from said trim panel to expose said opening.

3. The automotive interior component of claim 2 further comprising:
    a covering attached to said bolster, said covering positioned relative to said electroluminescent lamp such that visible light emitted by said electroluminescent lamp is directed through said covering.

4. The automotive interior component of claim 3 wherein said covering includes a plurality of openings through which visible light from said electroluminescent lamp is transmitted.

5. The automotive interior component of claim 4 wherein said openings have a shape recognizable as a symbol by an occupant of the vehicle to which the vehicle door is attached.

6. The automotive interior component of claim 5 wherein said openings are arranged to form at least one alphanumeric character.

7. The automotive interior component of claim 3 wherein said covering is a solid layer configured for changing a color of the visible light emitted by said electroluminescent lamp.

8. A method of making an automotive interior trim assembly including a bolster and a trim panel, the method comprising:
    placing an electroluminescent lamp between mold sections of a mold;
    closing the mold sections to form a mold cavity with a geometrical shape resembling the bolster;
    injecting a molten polymer resin into the mold cavity to fill a portion of the mold cavity unfilled by the electroluminescent lamp;
    opening the mold sections after the molten polymer resin solidifies;
    ejecting the bolster from the mold; and
    coupling the bolster to the trim panel.

9. The method of claim 8 further comprising:
    shaping the bolster after ejection from the mold to define a final geometrical shape.

* * * * *